United States Patent
Bikshandi et al.

(10) Patent No.: US 8,924,946 B2
(45) Date of Patent: Dec. 30, 2014

(54) SYSTEMS AND METHODS FOR AUTOMATICALLY OPTIMIZING HIGH PERFORMANCE COMPUTING PROGRAMMING LANGUAGES

(75) Inventors: Ganesh Bikshandi, Bangalore (IN); Krishna Nandivada Venkata, Bangalore (IN); Igor Peshansky, Hillsdale, NJ (US); Vijay Anand Saraswat, Mahopac, NY (US)

(73) Assignee: International Business Machines Corporation, Armonk, NY (US)

( * ) Notice: Subject to any disclaimer, the term of this patent is extended or adjusted under 35 U.S.C. 154(b) by 781 days.

(21) Appl. No.: 12/954,450

(22) Filed: Nov. 24, 2010

(65) Prior Publication Data
US 2012/0131549 A1 May 24, 2012

(51) Int. Cl.
*G06F 9/45* (2006.01)

(52) U.S. Cl.
CPC ..................... *G06F 8/458* (2013.01)
USPC ........... 717/149; 717/136; 717/146; 717/151; 717/154

(58) Field of Classification Search
CPC ........... G06F 8/52; G06F 8/456; G06F 8/443; G06F 8/458; G06F 9/45504
See application file for complete search history.

(56) References Cited

U.S. PATENT DOCUMENTS

| | | | |
|---|---|---|---|
| 6,088,511 A * | 7/2000 | Hardwick | 717/149 |
| 6,292,822 B1 * | 9/2001 | Hardwick | 718/105 |
| 6,708,330 B1 | 3/2004 | Moberg et al. | |
| 7,954,095 B2 * | 5/2011 | Archer et al. | 717/149 |
| 8,122,441 B2 * | 2/2012 | Barsness et al. | 717/146 |
| 8,214,814 B2 * | 7/2012 | Barsness et al. | 717/151 |
| 8,234,635 B2 * | 7/2012 | Isshiki et al. | 717/149 |
| 8,261,249 B2 * | 9/2012 | Archer et al. | 717/149 |
| 8,381,204 B2 * | 2/2013 | Das et al. | 717/154 |
| 8,495,603 B2 * | 7/2013 | Archer et al. | 717/149 |
| 8,539,456 B2 * | 9/2013 | Supalov et al. | 717/136 |
| 2008/0065589 A1 * | 3/2008 | Birka et al. | 707/2 |
| 2008/0229300 A1 * | 9/2008 | O'Brien | 717/168 |
| 2009/0063614 A1 * | 3/2009 | Donawa et al. | 709/202 |
| 2009/0276765 A1 * | 11/2009 | Das et al. | 717/154 |
| 2010/0333074 A1 * | 12/2010 | Supalov et al. | 717/136 |
| 2011/0271263 A1 * | 11/2011 | Archer et al. | 717/149 |

FOREIGN PATENT DOCUMENTS

CN 101464799 A 6/2009

OTHER PUBLICATIONS

Small et al., Maximizing MPI point-to-point communication performance on RDMA-enabled clusters with customized protocols, Jun. 2009, 10 pages.*
Danalis et al., MPI-aware compiler optimizations for improving communication-computation overlap, Jun. 2009, 10 pages.*
Tipparaju et al., Investigating High Performance RMA Interfaces for the MPI-3 Standard, 2009, 8 pages.*

(Continued)

*Primary Examiner* — Thuy Dao
(74) *Attorney, Agent, or Firm* — Griffiths & Seaton PLLC

(57) ABSTRACT

Systems and methods for replacing inferior code segments with optimal code segments. Systems and methods for making such replacements for programming languages using Message Passing Interface (MPI) are provided. For example, at the compiler level, point-to-point code segments may be identified and replaced with all-to-all code segments. Programming code may include X10, Chapel and other programming languages that support parallel for loop.

22 Claims, 3 Drawing Sheets

(56) References Cited

OTHER PUBLICATIONS

Vikram S. Adve et al., "Compiler-Optimized Simulation of Large-Scale Applications on High Performance Architectures," available online at http://www.idealibrary.com, Journal of Parallel and Distributed Computing, Feb. 2001, 33 pages.

Ganesh Bikshandi, "Efficient, Portable Implementation of Asynchronous Multi-place Programs," ACM 978-1-60558-397-6/09/02, 2009, pp. 271-281.

Anthony Danalis, "MPI-aware Compiler Optimizations for Improving Communication-Computation Overlap," ACM 978-1-60558-498-0/09/06, 2009, pp. 316-325.

Mackale Joyner et al., "Optimizing Accesses in High Productivity Languages," High Performance Computing and Communications, Lecture Notes in Computer Science, 2007, vol. 4782/2007, pp. 432-445, DOI: 10.1007/978-3-540-75444-2_43.

Jinchuan Ke, "Data Communication Analysis and Algorithm for the Efficiency of Data Distribution in High Performance Computing," 2008 International Conference on Advanced Computer Theory and Engineering, IEEE 978-0-7695-3489-3/08, 2008, pp. 566-570.

Paek, et al, "Efficient and Precise Array Access Analysis", 45 pages, vol. 24, No. 1, Jan. 2002, ACM Transactions on Programming Languages & Systems.

* cited by examiner

SYSTEMS AND METHODS FOR AUTOMATICALLY OPTIMIZING HIGH PERFORMANCE COMPUTING PROGRAMMING LANGUAGES

BACKGROUND

High performance computing (HPC) through supercomputers, computer clusters, or real-time computing has many advantages. However, it also presents serious challenges to HPC programmers. One such challenge involves tuning critical code sections for optimal performance. The tuning process is very complicated because it is highly dependent upon the system hardware that the code will run on. In addition, challenges are often aggravated by non-portability of performance optimizations across different architectures.

BRIEF SUMMARY

In summary, one aspect provides a method comprising: analyzing one or more programming code segments; accessing one or more programming libraries; identifying one or more inferior code fragments that correspond to one or more optimal code fragments within the one or more programming libraries; replacing the one or more inferior code fragments with the one or more optimal code fragments; and invoking the one or more programming code segments.

Another aspect provides a system comprising: one or more processors; and a memory operatively connected to the one or more processors; wherein, responsive to execution of computer readable program code accessible to the one or more processors, the one or more processors are configured to: analyze one or more programming code segments; access one or more programming libraries; identify one or more inferior code fragments that correspond to one or more optimal code fragments within the one or more programming libraries; replace the one or more inferior code fragments with the one or more optimal code fragments; and invoke the one or more programming code segments.

A further aspect provides a computer program product comprising: a computer readable storage medium having computer readable program code embodied therewith, the computer readable program code comprising: computer readable program code configured to analyze one or more programming code segments; computer readable program code configured to access one or more programming libraries; computer readable program code configured to identify one or more inferior code fragments that correspond to one or more optimal code fragments within the one or more programming libraries; computer readable program code configured to replace the one or more inferior code fragments with the one or more optimal code fragments; and computer readable program code configured to invoke the one or more programming code segments.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
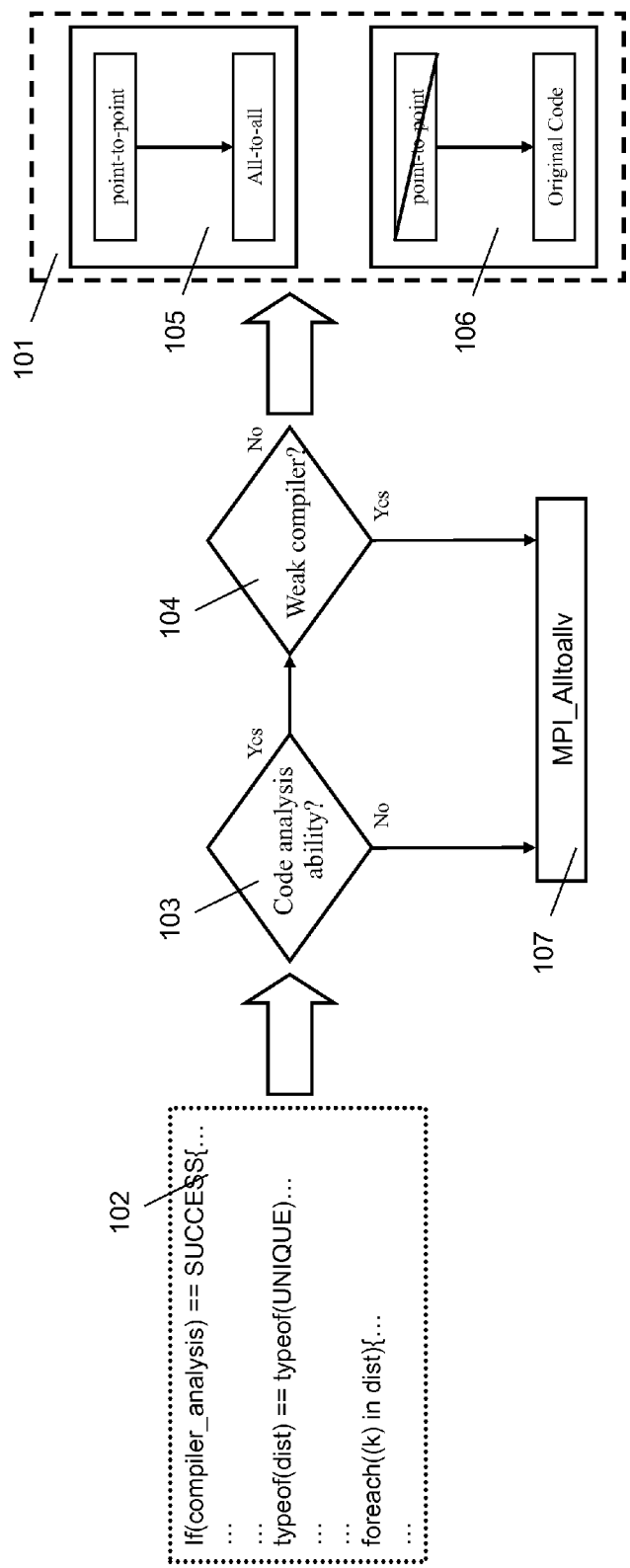
FIG. 1 illustrates a high-level depiction of an embodiment.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the claims, but is merely representative of those embodiments.

Reference throughout this specification to "embodiment (s)" (or the like) means that a particular feature, structure, or characteristic described in connection with the embodiment is included in at least one embodiment. Thus, appearances of the phrases "according to embodiments" or "an embodiment" (or the like) in various places throughout this specification are not necessarily all referring to the same embodiment.

Furthermore, the described features, structures, or characteristics may be combined in any suitable manner in one or more embodiments. In the following description, numerous specific details are provided to give a thorough understanding of example embodiments. One skilled in the relevant art will recognize, however, that aspects can be practiced without one or more of the specific details, or with other methods, components, materials, et cetera. In other instances, well-known structures, materials, or operations are not shown or described in detail to avoid obfuscation.

As the applications and demands of HPC expand, the expected performance levels correspondingly increase. For example, as HPC encounters the peta-scale performance standards and beyond, more reliable, robust, and user-friendly techniques for optimizing critical components are desired. One approach to meet these demands is to tune certain code sections for optimal performance. Utilizing library calls for critical components presents one solution. Current technology provides that the responsibility of replacing an appropriate section of code with the correct library call ultimately lies with the programmer. For example, different libraries of code can be selected by the programmer depending upon the target hardware. As such, this approach is essentially a manual process. Thus, automation of this process provides a solution to the optimization problem.

HPC requires applications written in a top-level language and involves multiple computers and threads that must send messages back and forth to each other. The methods for this messaging system are often implemented in the Message Passing Interface (MPI). One common method is point-to-point communication, which allows one process to send a message to another specific process. Another method is all-to-all communication, which may be implemented in MPI through the MPI_Alltoall collective communication operation. Certain communication methods may be implemented in a faster and more efficient form than other methods. For example, in component based optimization, all-to-all communication are identified and fast, efficient algorithms are used to implement the all-to-all communication. As such, the use of all-to-all communication may be faster than other communication methods, such as the point-to point communication method.

Embodiments provide for detecting code fragments that can be replaced by more optimal code fragments (hereinafter 'inferior code fragments'), and replacing them with the more optimal code fragments. According to embodiments, code fragments of an HPC high level language are analyzed using a compiler which automatically recognizes those fragments that correspond to a specific optimal code fragment. Embodiments identify the code segment being analyzed, ascertain what is being accomplished by the code segment, and determine whether the code fragments may be replaced by all-to-all library code. According to embodiments, determining whether code fragments may be replaced by all-to-all library code may consist of identifying whether the code fragment is of the correct type for replacement and, if it is the correct type, whether it would be safe to replace the code fragment. Predetermined safety criteria may be used by embodiments to determine whether it is safe to replace an inferior code fragment with optimal all-to-all code. Embodiments provide that the fragments that correspond to the optimal code fragment are point-to-point communication fragments. Further embodiments provide that the optimal code fragments are all-to-all communication fragments.

The X10 programming language with its runtime using an MPI environment will serve herein as a non-limiting example. However, embodiments provide for other programming languages, including, but not limited to, task parallel languages such as Chapel, or languages that support "parallel for loop," including, but not limited to, UPC and OpenMP. X10 is a modern object orientated programming language designed for enabling high productivity in HPC. According to embodiments, X10 application code fragments are analyzed using a compiler and those code fragments that correspond to MPI_Alltoall collective communication operations are recognized and replaced by all-to-all code fragments.

Referring now to FIG. 1, therein is depicted a high-level example using the X10 programming language. The compiler 101 attempts to analyze X10 code segments 102. If the compiler has the analysis ability 103 and if it is not a weak compiler 104, point-to-point communication fragments 105 are identified and replaced with MPI_Alltoall all-to-all communication 105. If the compiler does not have the analysis ability 103 or it is a weak compiler 104, option MPI_Alltoallv 107 is used. MPI_Alltoallv 107 is another MPI library routine which incurs higher cost than the MPI_Alltoall 105 option, including extra run time, but is still efficient compared to original code segments 102. If the X10 code segment 102 does not have point-to-point communication fragments 105, then the compiler 101 will simply invoke the original code 106.

Figure 2:
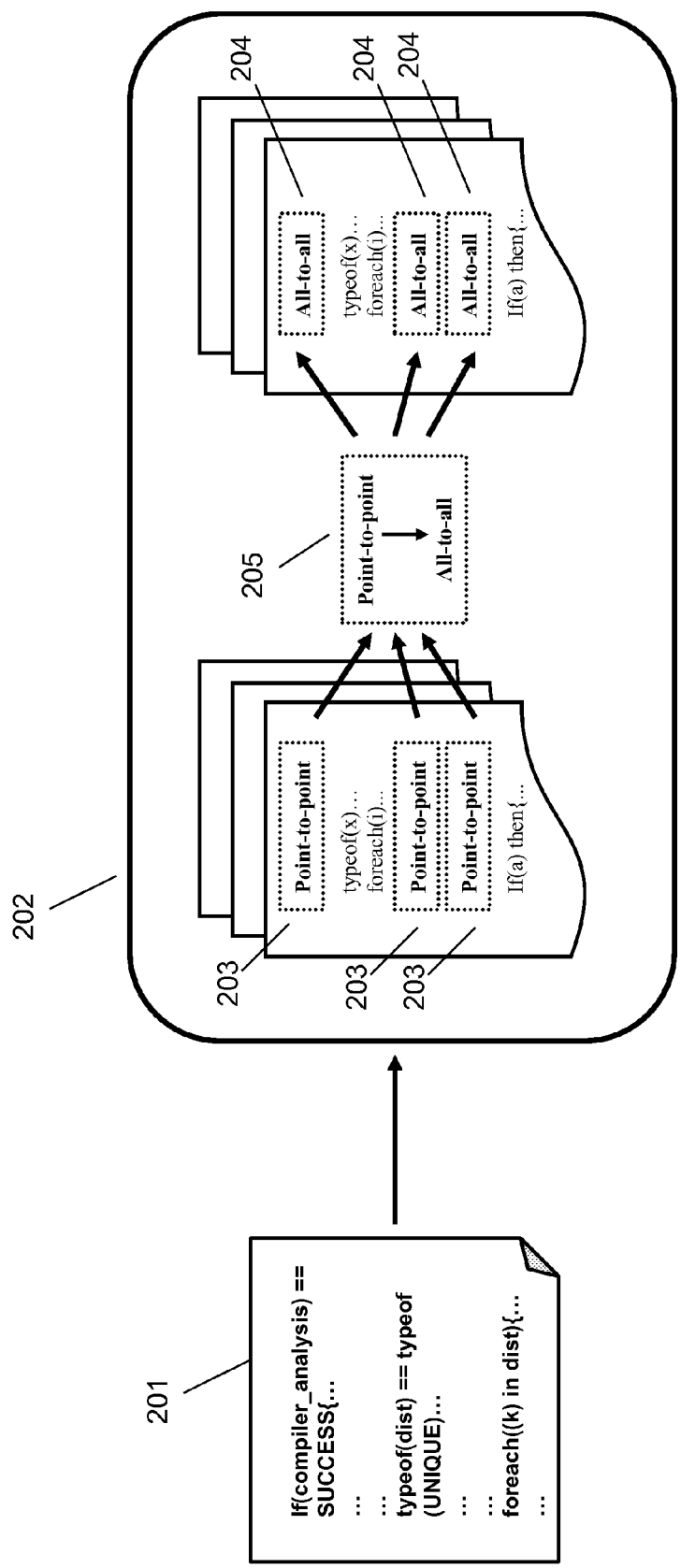
FIG. 2 illustrates an example of point-to-point code replacement.

Referring now to FIG. 2, therein is depicted an example of point-to-point code replacement according to embodiments. Code segments 201 enter the compiler 202 for analysis. The compiler 202 identifies 205 point-to-point code segments 203 that may be replaced with optimal code, and replaces the point-to-point code segments 203 with all-to-all code segments 204.

A use case involving a particular X10 code fragment now serves as a non-limiting example. The X10 code fragment is as follows:

```
@Immediate finish ateach ((p) in dist) {
val dstBegin = here * chunkSize;
val dstEnd = (here + 1) * chunkSize – 1;
foreach ((k) in dist) {
    val srcBegin = k * chunkSize;
    val srcEnd = (k+1) * chunkSize – 1;
    //useful computation
    val Y_here = Y( );
    async (dist[k]) {
        val X_here = X( );
        x10.lang.Runtime.arrayCopy (Y_here, srcBegin:srcEnd, X_here,
```

-continued

```
dstBegin:dstEnd);
    }
}
```

In the code fragment, Y and X are local arrays. The outermost "ateach" loop is executed across all the places. Thus, every place executes exactly one of its iteration. Inside that iteration, a foreach loop is executed for all the points in the region of the unique distribution. i.e, for all the places. Every iteration of the foreach loop computes the source and destination offsets of the arrays Y and X. The "async" statement spawns an async on place k, whose body executes the arrayCopy routine. arrayCopy is a pre-defined runtime call that copies a chunk of data of given size from a local address (identified by (array, region) pair) to a remote address (also identified by (array, region) pair).

To successfully convert this code fragment in to an MPI-_Alltoall call, the compiler has to do the following analysis:

1. Split the nested loops into two loops. One loop that does useful computation and another loop that just does the async. There should be no cross-iteration dependency between the "body" and the "async" parts. Any standard dependence analysis technique can be used to infer this.

2. k^th iteration of the foreach loop should spawn an async on place k. This is easy to check for as a UNIQUE distribution, dist, dist[k]=k. A check for a UNIQUE distribution may be done at runtime. As such, the compiler has to simply check if the range for accessing dist is [dist.lo:dist.hi] using linear memory access descriptor (LMAD).

3. The body of the spawned async should consist of an array copy statement. No other statements are allowed in the spawned asyncs. If other statements exist, factor them out if possible.

4. Y and X are one dimensional local arrays. Locality can be enforced by using PlaceLocalTypes and PlaceLocalHandle. In this non-limiting use case example, PlaceLocalTypes are obtained by decorating a type with "!". This means that the type is local (i.e. is hosted on the current place) and the check is done at the compile time. Explicit typing is not required in X10 for local variables, and compilers will infer that type automatically using the type inference mechanism. The uni-dimensionality property can be inferred using the constraint types on properties. PlaceLocalHandle is a library API provided by X10 runtime that gives a handle on the local current place and allows object storage in per-place basis. By using "( )", one can get the reference to the object stored at the current place.

5. The "finish" should be annotated @immediate by the programmer. The @immediate annotation is a programmer annotation that gives a guarantee that each activity spawned inside that code fragment can be "inlined," that is, the body of the activity can be executed without spawning the activity.

6. The range [srcBegin:srcEnd] of k^th iteration should be of size "chunkSize" and monotonic with respect to that of the (k+1)st iteration. The range [dstBegin:dstEnd] should be of size chunkSize and monotonic with respect to the "ateach" loop. These can be discovered using LMAD and the "colasecable" property of LMAD.

6a) While doing the above analysis, compute the srcSpan (which is the union of all the LMADs accessed in the inner foreach loop) and dstSpan (which is the union of all the LMADs accessed in the outer ateach loop). The coalsecing algorithm of LMAD will automatically do this.

In the analysis as described in steps 1-6 of this non-limiting example use-case is successful, the compiler generates an MPI_Alltoall. If the analysis described in step 6 has failed, but the remaining steps have succeeded, MPI_Alltoallv is generated. In all other cases, the original code fragment is retained. This is realized in X10 by:

```
if (compiler_analysis == SUCCESS ) { //case MPI_Alltoall
val srcSpan = //region computed by lmad analysis
val dstSpan = //region computed by LMAD analysis
if (typeof(dist) == typeof(UNIQUE) && isEquals(srcSpan, Y.region)
&& isEquals(dstSpan, X.region)) {
        MPI_Alltoall_wrapper(dist, Y, X, Chunksize);
} else if (typeof(dist) == typeof(UNIQUE)) { //case MPI_Alltoallv
        MPI_Alltoall (to transmit the shapes)
        copy offsets
        MPI_Alltoallv( );
}
} else { //
    //original X10 code
}
```

In addition, the MPI_Alltoall_wrapper is an X10 native method:

```
@Native ("c++", "MPI_Alltoall(dist.comm( ), Y.raw( ), size,
X.raw( ), size)");
    public native def MPI_Alltoall_wrapper (dist: Dist, Y: Rail[T], X:
    Rail[T],
size:Int);
```

Figure 3:
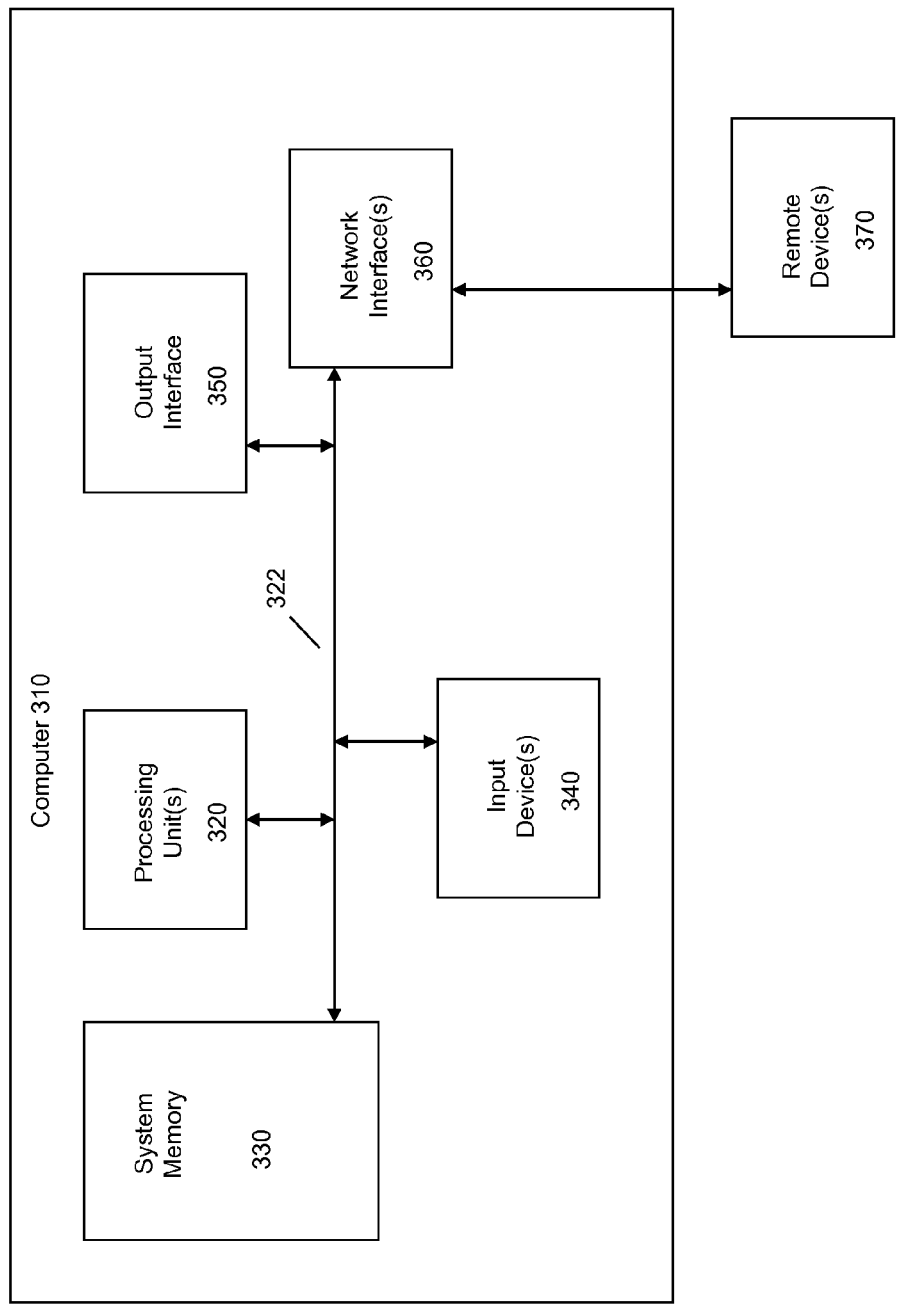
FIG. 3 illustrates and example computer.

Referring to FIG. 3, it will be readily understood that certain embodiments can be implemented using any of a wide variety of devices or combinations of devices. An example device that may be used in implementing one or more embodiments includes a computing device in the form of a computer 310. In this regard, the computer 310 may execute program instructions configured to create a historical database, extract candidate information, enumerate relevant position features, rank candidates according to fitness score, and perform other functionality of the embodiments, as described herein.

Components of computer 310 may include, but are not limited to, a processing unit 320, a system memory 330, and a system bus 322 that couples various system components including the system memory 330 to the processing unit 320. The computer 310 may include or have access to a variety of computer readable media. The system memory 330 may include computer readable storage media in the form of volatile and/or nonvolatile memory such as read only memory (ROM) and/or random access memory (RAM). By way of example, and not limitation, system memory 330 may also include an operating system, application programs, other program modules, and program data.

A user can interface with (for example, enter commands and information) the computer 310 through input devices 340. A monitor or other type of device can also be connected to the system bus 322 via an interface, such as an output interface 350. In addition to a monitor, computers may also include other peripheral output devices. The computer 310 may operate in a networked or distributed environment using logical connections to one or more other remote computers or databases. The logical connections may include a network, such local area network (LAN) or a wide area network (WAN), but may also include other networks/buses.

It should be noted as well that certain embodiments may be implemented as a system, method or computer program product. Accordingly, aspects may take the form of an entirely hardware embodiment, an entirely software embodiment (including firmware, resident software, micro-code, et cetera) or an embodiment combining software and hardware aspects that may all generally be referred to herein as a "circuit," "module" or "system." Furthermore, aspects may take the form of a computer program product embodied in one or more computer readable medium(s) having computer readable program code embodied therewith.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, et cetera, or any suitable combination of the foregoing.

Computer program code for carrying out operations for various aspects may be written in any combination of one or more programming languages, including an object oriented programming language such as Java™, Smalltalk, C++ or the like and conventional procedural programming languages, such as the "C" programming language or similar programming languages. The program code may execute entirely on a single computer (device), partly on a single computer, as a stand-alone software package, partly on single computer and partly on a remote computer or entirely on a remote computer or server. In the latter scenario, the remote computer may be connected to another computer through any type of network, including a local area network (LAN) or a wide area network (WAN), or the connection may be made for example through the Internet using an Internet Service Provider.

Aspects are described herein with reference to flowchart illustrations and/or block diagrams of methods, apparatuses (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Although illustrated example embodiments have been described herein with reference to the accompanying drawings, it is to be understood that embodiments are not limited to those precise example embodiments, and that various other changes and modifications may be affected therein by one skilled in the art without departing from the scope or spirit of the disclosure.

What is claimed is:

1. A method executed by at least one processor device comprising:
   analyzing, using a compiler operated by the at least one processor device, one or more programming code segments to automatically recognize code fragments that correspond to one or more optimal code fragments for detecting that the one or more programming code segments need to be replaced, wherein the one or more optimal code fragments are one of point-to-point communication fragments and all-to-all communication fragments;
   accessing one or more programming libraries;
   identifying one or more inferior code fragments that correspond to one or more optimal code fragments within the one or more programming libraries;
   ascertaining what is being accomplished by the one or more programming code segments;
   determining if the one or more optimal code fragments is a correct type of code fragment for replacement and whether it is safe to replace the one or more inferior code fragments with the one or more optimal code fragments that are the correct type of code fragment using predetermined safety criteria; and
   replacing the one or more inferior code fragments with the one or more optimal code fragments, wherein the one or more code segments are analyzed by a compiler, and if the compiler is not able to analyze the one or more code segments then option Message Passing Interface (MPI) library routine is utilized.

2. The method according to claim 1, wherein the one or more programming code segments are comprised of X10 programming code.

3. The method according to claim 1, further comprising determining what programming functions the one or more programming code segments perform.

4. The method according to claim 1, wherein the programming code segments utilize Message Passing Interface.

5. The method according to claim 4, wherein the inferior code fragments comprise point-to-point communication code fragments.

6. The method according to claim 4, wherein the one or more optimal code fragments comprise all-to-all communication fragments.

7. The method according to claim 6, wherein the all-to-all communication fragments comprise MPI_Alltoall.

8. The method according to claim 1, wherein if the compiler is weak then option MPI_Alltoallv is utilized.

9. A system comprising:
   one or more processors;
   a compiler operatively connected to the one or more processors; and
   a memory operatively connected to the one or more processors and the compiler;
   wherein, responsive to execution of computer readable program code accessible to the one or more processors, the one or more processors are configured to:
   analyze, using a compiler operated by the at least one processor device, one or more programming code segments to automatically recognize code fragments that correspond to one or more optimal code fragments for detecting that the one or more programming code segments need to be replaced, wherein the one or more optimal code fragments are one of point-to-point communication fragments and all-to-all communication fragments;
   access one or more programming libraries;
   identify one or more inferior code fragments that correspond to one or more optimal code fragments within the one or more programming libraries;
   ascertain what is being accomplished by the one or more programming segments;
   determine if the one or more optimal code fragments is a correct type of code fragment for replacement and whether it is safe to replace the one or more inferior code fragments with the one or more optimal code fragments that are the correct type of fragment using predetermined safety criteria; and
   replace the one or more inferior code fragments with the one or more optimal code fragments, wherein the one or more code segments are analyzed by a compiler, and if the compiler is not able to analyze the one or more code segments then option Message Passing Interface (MPI) library routine is utilized.

10. The system according to claim 9, wherein the one or more programming code segments are comprised of X10 programming code.

11. The system according to claim 9, further comprising:
    determine what programming functions the one or more programming code segments perform.

12. The system according to claim 9, wherein the programming code segments utilize Message Passing Interface.

13. The method according to claim 12, wherein the inferior code fragments comprise point-to-point communication code fragments.

14. The system according to claim 12, wherein the one or more optimal code fragments comprise all-to-all communication fragments.

15. The system according to claim 14, wherein the all-to-all communication fragments comprise MPI_Alltoall.

16. A computer program product comprising:
a non-transitory computer readable storage medium having computer readable program code embodied therewith, the computer readable program code comprising:
computer readable program code configured to analyze, using a compiler operated by the at least one processor device, one or more programming code segments to automatically recognize code fragments that correspond to one or more optimal code fragments for detecting the one or more programming code segments needing to be replaced, wherein the one or more optimal code fragments are one of point-to-point communication fragments and all-to-all communication fragments;
computer readable program code configured to access one or more programming libraries;
computer readable program code configured to identify one or more inferior code fragments that correspond to one or more optimal code fragments within the one or more programming libraries;
computer readable program code configured to ascertain what is being accomplished by the one or more programming code segments;
computer readable program code configured to determine if the one or more optimal code fragments is a correct type of code fragment for replacement and whether it is safe to replace the one or more inferior code fragments with the one or more optimal code fragments that are the correct type of code fragment using predetermined safety criteria; and
computer readable program code configured to replace the one or more inferior code fragments with the one or more optimal code fragments, wherein the one or more code segments are analyzed by a compiler, and if the compiler is not able to analyze the one or more code segments then option Message Passing Interface (MPI) library routine is utilized.

17. The computer program product according to claim 16, wherein the one or more programming code segments are comprised of X10 programming code.

18. The computer program product according to claim 16, further including computer readable program code configured to determine what programming functions the one or more programming code segments perform.

19. The computer program product according to claim 16, wherein the programming code segments utilize Message Passing Interface.

20. The computer program product according to claim 16, wherein the inferior code fragments comprise point-to-point communication code fragments.

21. The computer program product according to claim 16, wherein the one or more optimal code fragments comprise all-to-all communication fragments.

22. The computer program product according to claim 21, wherein the all-to-all communication fragments comprise MPI_Alltoall.

* * * * *